3,594,268
IMPREGNATED CELLULOSIC LAMINATES AND INTERMEDIATES THEREFOR

Ronald H. Dahms, Springfield, and George J. Anderson, Wilbraham, Mass., assignors to Monsanto Company, St. Louis, Mo.

No Drawing. Continuation-in-part of application Ser. No. 651,387, July 6, 1967. This application June 21, 1968, Ser. No. 738,782
Int. Cl. B32b 27/10
U.S. Cl. 161—250 9 Claims

ABSTRACT OF THE DISCLOSURE

Impregnated cellulosic sheets and laminates which are cold punchable and have good electrical properties. Such constructions are prepared from cellulosic substrates impregnated with a mixture of carboxylated alkadiene interpolymer and a low molecular weight phenolformaldehyde resin and then over treated with a certain higher molecular weight substituted phenol-formaldehyde resin. Laminates are made from the resulting sheet-like members by first advancing same and then laying up and thermosetting under heat and pressure.

RELATED APPLICATIONS

This application is a continuation-in-part of our earlier filed application Ser. No. 651,387, filed July 6, 1967 and now abandoned.

BACKGROUND

In the art of making cellulosic sheets and laminates thereof which are impregnated with phenol-aldehyde resins, it has long been appreciated that, while such constructions can be prepared so as to have good electrical properties, it has generally not heretofore been possible to make such constructions so as to have both good electrical properties and cold punchability. In addition to both such properties, such constructions should have relatively good water absorption characteristics, flexural strength characteristics, and cold flow characteristics.

Cold punchable cellulosic laminates having good electrical properties (e.g. low dielectric constants and low dissipation factors) are desirable for use in electrical applications as support or as insulation members for conductive elements. Such laminates are generally used in a sheet or block form which is then punched or otherwise machined to provide a particular desired configuration for individual use situations. Heretofore, in order to obtain good electrical properties, paper or other cellulosic sheet-like substrate member in nonwoven or woven form was generally first impregnated with a phenolic resin and then the resulting member was overtreated with a different phenolic resin, the second resin being chosen for its thermoset properties, however, laminate constructions made from sheets so impregnated suffer from a number of undesirable properties, and typically do not have both the properties of cold punchability and good electrical properties in combination with commercially acceptable levels for other properties.

It has now been discovered that a cellulosic substrate, especially one with a low ash content, which has been first impregnated with a combination of low molecular weight phenol-formaldehyde resole resin and carboxylated alkadiene interpolymer and then impregnated with a certain substituted phenol-formaldehyde resole resin (without plasticizer) to make sheet like members is especially well adapted for use in the manufacture of laminates having a surprising and unexpectedly superior combination of excellent cole punchability characteristics and electrical properties.

SUMMARY

This invention is directed to cold punchable, high electrical propertied laminates made from certain polymer impregnated cellulosic substrates in sheet-like form, to such impregnated substrates themselves, and to methods for making such substrates and such laminates.

The laminates of this invention, in addition to being punchable, are generally characterized by having good water absorption characteristics, good flexual strength characteristics, good cold flow characteristics, and, especially both good electrical dielectric constants and good dissipation fatcors.

For purpose of this invention, cold punchability is conveniently measured using ASTM Test D–617, water absorption, using ASTM Test No. D–229; flexural strength, using ASTM Test No. D–790; cold flow (or deformation under load), using ASTM Test No. D–621; dielectric constants, using ASTM Test No. D–150; and dissipation factors, using ASTM Test No. D–150. Typical values for cold punchability range from about 75 to 95; for water absorption, from about 0.5 to 0.7%; for flexual strength, from about 1500 to 1900 pounds per sq. in.; for cold flow, from about 0.8 to 1.2% (as measured at 50° C., 4,000 p.s.i. after humidity aging); for dielectric constants, from about 4.2 to 4.7; and for dissipation factors, from about .031 to .038. Those skilled in the art will appreciate that an individual laminate of this invention may not have all properties above indicated with values within the ranges indicated; the above are general characterizations only.

In accordance with the present invention, there is produced an intermediate sheet-like member adapted for use in the manufacture of cold punchable laminates. This sheet member employs a substrate comprising cellulosic fibers arranged into generally integral sheet like form. This is first impregnated with a first composition comprising (dry weight basis) from about 35 to 65 weight percent of a water-soluble phenol-formaldehyde resole resin and the balance up to 100 weight percent of such first composition being a carboxylated alkadiene interpolymer such that the resulting first-impregnated substrate contains from about 5 to 40 weight percent of said composition (dry weight basis). The resulting so-first-impregnated substrate is next secondly impregnated with a second composition comprising a substituted phenol-formaldehyde resole resin such that the resulting so-secondly impregnated substrate contains from about 30 to 60 weight percent of said second composition (dry weight basis).

To produce such an intermediate sheet member, one employs when first impregnating a first composition comprising from about 5 to 40 weight percent (total composition basis) of a mixture comprising a first dissolved water soluble phenolformaldehyde resolve resin and an aqueous phase colloidially dispersed carboxylated alkadiene interpolymer, from about 5 to 100 weight percent water, and the balance up to 100 weight percent of any given first composition being an organic liquid which:

(1) is substantially inert,
(2) evaporate below about 150° C. at atmospheric pressures, and
(3) Is a mutual solvent for said first resole resins.

Such mixture (as indicated above) comprises (dry weight basis) from about 35 to 65 weight percent of said first resole resin and the balance up to 100 weight percent of a given mixture being said carboxylated alkadiene interpolymer.

One impregnates such substrate with such first composition to an extent such that the resulting so impregnated dried substrate contains from about 5 to 40 weight percent of said first composition (dry weight basis).

The first dissolved water soluble phenol-aldehyde resole resin used in the present invention is well known to those skilled in the art. It has a formaldehyde to phenol mol ratio of from about 0.9 to 2.5. It is conveniently separately produced by reacting under aqueous liquid phase conditions phenol with formaldehyde preferably in the presence of an organic basic catalyst to produce a solution containing phenol-formaldehyde resinous condensation product. Such resins having a low molecular weight are preferred, especially those which can be prepared in the form of at least a 55 weight percent aqueous solution. Such a resin solution characteristically has a water dilutability of at least about 1:1, and preferably of at least about 8:1. In addition, this resin has a free formaldehyde content which is less than about 5 weight percent. Preferably, the phenolformaldehyde mol ratio in this resin ranges from about 1½ to 2. An organic basic catalyst is preferably used in impregnation as indicated so as to produce a resole resin product which will not contain free ions which might conduct an electrical charge after the resin has been thermoset. Suitable organic basic catalysts are well known to the art; examples include triethylamine, hexamethylenetetramine, and the like.

The carboxylated alkadiene interpolymer used in the preparation of the laminate constructions of this invention is one which is conveniently separately prepared as an aqueous phase colloidially dispersed material in the form of a latex in water. Suitable carboxylated alkadiene interpolymers are prepared by polymerizing a monomer mixture comprising from about 3 to 8 weight percent of acrylic acid, from about 35 to 60 weight percent of a conjugated alkadiene monomer, and the balance up to 100 weight percent of any given such monomer mixture comprising at least one material selected from the group consisting of monovinyl aromatic compounds and alkene nitrile compounds. A minor amount of a surfactant is added to the monomer mixture before polymerization. These latices and methods for their preparation are described in the literature; see, for example, Bovey et al in "Emulsion Polymerization," published by Interscience Publisher, Inc. 1955 and Schildknecht in "Polymer Process" published by Interscience Publishers, Inc. 1956. Optionally, such an emulsion may have chemically incorporated thereinto through polymerization a small quantity, say, less than about 2 weight percent based on total interpolymer weight, of a divinyl aromatic compound such as divinyl benzene, or the like.

Suitable monovinyl aromatic compounds include styrene (preferred); alkyl-substituted styrenes, such as ortho-, meta-, and para-methyl styrenes, 2,4-dimethyl styrene, para-ethylstyrene, or alphamethyl styrene; halogen substituted styrenes such as ortho-, meta-, and para-chlorostyrenes, or bromostyrenes, 2,4-dichlorostyrene; and mixed halogen plus alkyl-substituted styrenes, such as 2-methyl-4-chlorostyrene; vinyl naphthalene; vinyl anthracene; mixtures thereof, and the like. The alkyl substituents generally have less than five carbon atoms, and may include isopropyl and isoboutyl groups.

Suitable alkene nitrile compounds include acrylonitrile (preferred), methacrylonitrile, ethacrylonitrile, mixtures thereof, and the like.

Suitable conjugated alkadiene monomers include butadiene, 3-methyl-1,3-butadiene, 2-methyl-1, 3-butadiene, piperylene chloroprene, mixtures thereof and the like. Conjugated 1,3 dienes are preferred.

Such a latex suitable for use in making a first composition for employement in the present invention can contain typically as made from about 30 to 70 parts by weight of total carboxylated alkadiene interpolymer with the balance up to 100 weight percent of a given latex being substantially water. Preferably, such a latex contains from about 45 to 60 parts by weight of such interpolymer.

To prepare a first composition of such dissolved water phenolaldehyde resin and carboxylated alkadiene interpolymer, one simply admixes the respective materials together. As initially prepared, the resulting composition typically has a total solids content (combined weight of carboxylated alkadiene interpolymer and phenol-formaldehyde resolve resin) ranging from about 40 to 65 weight percent. Conveniently, as prepared, the liquid phase of the resulting mixtures is substantially entirely water.

In general, an individual cellulosic substrate used in the laminates of the present invention is an integral preformed sheet-like member composed substantially of collulose fibers in a woven, non-woven, or mixed structure. Typical thicknesses range from about 3 to 30 mils (under about 10 being preferred). Such members are well known to the art and include paper and cloth broadly; they need have no special characteristics. The collulosic fibers used in such a substrate member can be of natural or synthetic origin and the sheet member can be in a woven or nonwove state. Typical wel known sources for colluose fibers iclude wood, cotton, and the like. Typically, average cellulosic fibers used in substrates employed in this invention have length to width ratios of at least about 2:1, and preferably about 6:1, with maximum length to width ratios being variable.

The term "substantially" as used herein in reference to cellulose fibers has reference to the fact that a substrate comprises mainly cellulose fibers with not more than about 5 to 10 percent of any given cellulosic substrate being other components, such as non-fibrous fillers, diluents, and the like, or fibrous non-cellulosic materials, such as those derived from organic sources (e.g. protein, synthetic organic polymeric fibers like polyesters, etc.) or inorganic sources (e.g. siliceous fibers or metallic fibers). Such other components when and if present characteristically have size ranges which are not greater in magnitude than the cellulosic fibers. Preferably, such other components are under 1 weight percent of the total weight of a starting individual cellulosic substrate member.

Particularly when high electrical properties are desired in a product laminate of the invention, the cellulosic substrate member should have a low ash content. Ash contents under 1 weight percent (based on total cellulosic substrate member weight) are preferred, and those having ash contents under 0.5 weight percent are more preferred.

Before a first composition is used for impregnation of a preformed cellulosic substrate, it is convenient to dilute such composition organic liquid (as described above) so that the total solids concentration of such resulting composition typically ranges from about 5 to 40 weight percent (as indicated), with solids contents of 15 to 18 percent being preferred. A primary reason for adding such an organic liquid to such an aqueous composition mixture is to permit one to impregnate a preformed cellulosic substrate such as paper without causing a deterioration in the wet strength thereof effectuated. By adding in with the water such an organic solvent, the wet strength of a preformed cellulosic substrate material after impregnation and before drying to remove volatile liquid is maintained at acceptable and convenient processing levels for subsequent drying, advancing, etc. by machines, etc. of the resulting impregnated sheet before or during the process of making a laminate construction of the invention.

When a first composition is used to impregnate cellulosic fibers not yet formed into a substrate sheet of cellulosic material (woven or non-woven) the first composition may not necessarily contain any such organic liquid, as when a first composition is added to paper pulp in the manufacture of paper on a Fourdrinier screen or the like.

In general, impregnation of a preformed substrate cellulosic member by a first composition can be accomplished by an conventional means, including spraying, dipping, coating, or the like, after which it is convenient and preferred to dry the so-treated sheet to remove residual volatile components and thereby leave an impregnated sheet-like construction. In drying, care is used to prevent leaving excessive volatile material in the impregnated sheet. In general, a volatile level of less than about 4 percent by weight is desired.

For purposes of this invention, volatile level is conveniently determined by loss in weight after 10 minutes at 160° C. of a sample impregnated sheet. As indicated, a so-impregnated sheet member contains from about 5 to 40 weight percent of solids derived from said first composition.

After a first impregnating procedure, the so-impregnated sheet member is secondly impregnated with a second composition comprising from about 30 to 70 weight percent (total composition basis) of a second dissolved substituted phenol-formaldehyde resole resin, from about 0 to 15 weight percent (total composition basis) of dissolved water, and the balance up to 100 weight percent (total composition basis) being an organic liquid which (similarly):

(1) is substantially inert,
(2) evaporates below about 150° C. at atmospheric pressures, and
(3) is a mutual solvent for said second resole resin and for said water (if present)

This second impregnation is carried out so that the resulting so-second impregnated substrate contains from about 30 to 60 weight percent of said second composition (dry weight basis).

The second impregnation procedure using such second composition may be similar to the first impregnation procedure (when a preformed sheet is used), with care being used in the subsequent drying to prevent excessive advancing and thermosetting beyond a cold flow of about 20 percent.

The second resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions a certain substituted phenol mixture with formaldehyde. This second resole resin further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises, and preferably in the range from about 50 to 500 centipoises. In addition, this resin has a free formaldehyde content which is less than about 5 weight percent.

The substituted phenol mixture used to make such second resole resin is itself prepared by reacting phenol under Friedel-Crafts conditions with a controlled mixture of carbocyclic compounds. The mixture of carbocyclic compounds comprises (on a 100 weight percent basis when in a form substantially free of other materials):

(A) From about 10 through 40 weight percent of compounds each molecule of which has:

(1) the indene nucleus,
(2) from 9 through 13 carbon atoms,
(3) as nuclear substituents from 0 through 4 methyl groups, (B) From about 5 through 70 weight percent of compounds each molecule of which has:

(1) the dicyclopentadiene nucleus,
(2) from about 10 through 13 carbon atoms,
(3) as nuclear substituents from 0 through 3 methyl groups, (C) From about 15 through 65 weight percent of componds each molecule of which has:

(1) a phenyl group substituted by a vinylidene group,
(2) from about 8 through 13 carbon atoms, (3) as substituents from 0 through 3 groups selected from the class consisting of methyl and ethyl, (D) From about 0 through 5 weight percent divinyl benzene, (E) Provided that the sum total of all such compounds in any given such mixture of carbocyclic compounds is always 100 weight percent.

At the time when such controlled mixture of carbocyclic compounds is reacted with phenol as indicated, there can be present in such mixture as diluents inert (i.e. respects reactivity towards phenol under Friedel-Crafts reaction conditions) organic compounds such as aromatic and aliphatic hydrocarbons. Thus, there is present, conveniently, at least about 25 weight percent of diluent in such total combination of mixture of carbocyclic compounds and diluent, although this value is variable depending upon reactants and reaction conditions. While there is no apparent upper limit on the amount of diluent which may be present, it is preferred that the amount of diluent present be not greater than about 95 weight percent (same basis). Preferably, the amount of diluent ranges from about 15 to 70 weight percent (same basis). Up to about 10 weight percent (same basis) of water can be present, but it is preferred to use substantially anhydrous conditions.

Carbocyclic compound mixtures useful in this invention are available commercially from various petroleum producers under a variety of trade names. For example, one suitable carbocyclic compound mixture is available from Enjay Chemical Company under the trade designation "Heart Cut LPD." Another suitable such mixture is available from Monsanto Company, St. Louis, Mo., under the trade designation "Resin Oil." Still another such mixture is available from the Gulf Oil Company under the trade designation "Resin Former Feed Stock." A presently preferred such mixture is the Monsanto Company "Resin Oil" which is a $C_8$ to $C_{13}$ product cut with a boiling range of from about 300 to 425° F. (150 to about 220° C.) and contains the indicated carbocyclic compound mixture. Shown below in Table I is a breakdown such as is made by vapor phase chromatography showing the composition of these three carbocyclic compound mixtures:

TABLE I

| | Gulf Oil [2] | Monsanto [3] | Enjay [4] |
|---|---|---|---|
| Vinylidene aromatics: | | | |
| Styrene $C_8$ | 7.6 | 1.4 | 10.1 |
| Alpha-methylstyrene $C_9$ | 1.6 | 2.8 | 2.2 |
| Beta-methylstyrene $C_9$ | 1.5 | 1.6 | 2.1 |
| Vinyltoluene $C_9$ | 4.5 | 17.4 | 10.5 |
| $C_2$ alkylstyrene [1] $C_{10}$ | 0.9 | 6.2 | 5.8 |
| Divinylbenzene $C_{10}$ | 0.3 | 1.3 | 1.6 |
| Indenes: | | | |
| Indene $C_9$ | 12.7 | 17.6 | 12.7 |
| Methylindene $C_{10}$ | 0.3 | 5.5 | 7.6 |
| Cyclopentadienes: | | | |
| Isoprene-cyclopentadiene $C_{10}$ | 0.6 | 0.3 | ---- |
| Dicyclopentadiene $C_{10}$ | 42.7 | 13.9 | 1.1 |
| Methylcyclopentadiene $C_{11}$ | 12.4 | 4.6 | 2.1 |
| Alkyl aromatics: | | | |
| Benzene $C_6$ | 0.5 | ---- | 0.1 |
| Toluene $C_7$ | 3.9 | ---- | 0.8 |
| $C_2$ alkylbenzene $C_8$ | 7.4 | 0.4 | 12.1 |
| $C_3$ alkylbenzene $C_9$ | 1.2 | 19.2 | 22.2 |
| $C_4$ alkylbenzene $C_{10}$ | ---- | 4.1 | 6.3 |
| Naphthalenes: Naphthalene $C_{14}$ | 0.2 | 3.2 | 2.2 |
| Unidentified (aliphatics) | 2.1 | ---- | ---- |
| Total carbocyclic compound mixture content | 84.8 | 72.6 | 55.9 |
| ASTM boil range, ° F. (ASTM D-86): | | | |
| Initial boiling point | 283 | 315 | 307 |
| 10% | 318 | 333 | 320 |
| 50% | 329 | 343 | 342 |
| 90% | 348 | 367 | 401 |
| End point | 364 | 402 | 411 |
| Residue | 1.0 | ---- | ---- |
| Specific gravity | 0.952 | 0.933 | 0.909 |

[1] This styrene compound is selected from the group consisting of ethylstyrene and dimethylstyrene.
[2] Available commercially from the Gulf Oil Company as "Resin Former Stock."
[3] Available commercially from Monsanto Co. under the trade designation, "Resin Oil."
[4] Available commercially from Enjay Co. under the trade designation "Heart Cut LPD."

By the term "dicyclopentadiene" reference is had to a molecule having the structure:

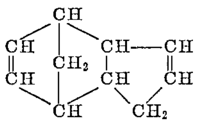

By the phrase "when in a form substantially free of other materials" reference is had to a mixture (e.g. of starting materials, of products, or the like, as the case may be) which is substantially free (e.g. on an analytical or a theoretical basis) of substances (like inerts) other than such mixture itself. For example, in Table I above, the carbocyclic compound mixtures are composed of indenes, vinylidene aromatic, and dicyclopentadienes, as well as inert diluents, such as "alkyl aromatics," "napthalenes" and "unidentified aliphatics," but each contains a combination (on a 100 weight percent basis in a form substantially free of other materials) of components (indenes, dicyclopentadiene, and vinylidene aromatic) as described above.

In this invention, all solids are conveniently measured using the ASTM Test Procedure D–115–55.

Also, in such a preferred embodiment, the substituted phenol used in making phenoilc resin is made using a carbocyclic compound mixture in which there are from about 20 through 40 weight percent of compounds having the indene nucleus (as above described), from about 15 through 30 weight) percent of compounds having the dicyclopentadiene nucleus (as above described) and from about 30 through 65 weight percent of compounds having a phenyl group and a vinylidene group as above described, the percentage of divinyl benzene in such preferred carbocyclic compound mixture being as described above. In any such more preferred carbocyclic compound mixture, there are a total of 100 weight percent of these three components.

The term "vinylidene" as used herein has generic reference both to vinylidene radicals ($CH_2{=}C{<}$), and vinyl radicals ($CH_2{=}CH{-}$ or $-CH{=}CH-$); observe that in carbocyclic compound mixtures used in this invention having a phenyl group substituted by a vinylidene group, alpha-methyl substitution is included in this definition, as well as styrene, methyl stryrene, and ethyl styrene.

To react phenol with such an aforedescribed carbocyclic compound mixture, it is convenient to use Friedel-Crafts
The term "Friedel-Crafts Conditions" as used herein
conditions, as indicated.

The term "Friedel-Crafts Conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol and suitable Friedel-Crafts acid catalysts are mixed, brought to the proper temperature and the carbocyclic compound mixture metered into the acidified (or catalyzed) phenol.

For purposes of this invention, the reaction of carbocyclic compound mixture with phenol is preferebly carried out at temperatures in the range of from about 25 to 200° C. although higher and lower temperatures can be used. Also, the reaction is preferably conducted under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated, the most preferred inert hydrocarbons have boiling points between about 70 and 140° C. The progress of the reaction can be monitored, if desired, by measuring the quantity remaining of unreacted carbocyclic compound mixture using, for example, vapor phase chromatography.

Friedel-Crafts catalysts which may be used in place of aluminum chloride, or together with aluminum chloride, include:

(A) Other inorganic halides, such as gallium, titanium, antimony and zinc halides (including $ZnCl_2$);

(B) Inorganic acids such as sulphuric, phosphoric and the hydrogen halides (including H F);

(C) Activated clays, silica gel and alumina;

(D) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid, and the like, or with inorganic acids, such as phosphoric acid, sulfuric acid, and the like, and (E) Alkyl, aryl and aralkyl sulfonic acids, such as ethane-sulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, $\beta$-naphthalene sulfonic acid, 1-naphthol-4-sulfonic acid, and the like.

When $BF_3$, as such, is employed, it is conveniently fed to a reaction mixture in gaseous form.

While any combination of carbocyclic compound starting mixture, phenol and catalyst can be used, it is particularly convenient to react in the presence of less than about 10 weight percent (based on the phenol) of acid catalyst.

The reaction mass is heated to a temperature in the range of from about 25 to 200° C. The rate of this reaction is dependent, to some degree, on the temperature employed. In general, the reaction is rapid, and a complete reaction between phenol and carbocyclic compound mixture is preferred. Generally, a heating time of from about 10 minutes to 4 hours is employed. The various process variables are summarized in Table II below.

TABLE II

| Process variable | Broad range | Preferred range |
|---|---|---|
| Temperature | About 25 to 200° C. | About 40 to 125° C. |
| Reaction time | Less than about 4 hrs. | About 10 to 30 min. |
| Catalyst (based on phenol) | Less than about 10 weight percent. | About 0.1 to 1.0 weight percent. |
| Inert hydrocarbon diluent (based on total weight carbocyclic mixture and diluent). | Up to about 75 weight percent. | About 20 to 35 weight percent. |
| Total carbocyclic mixture [1] (based on 100 parts by weight phenol). | About 10 to 80 parts by weight. | About 40 to 60 parts by weight. |

[1] On a 100 weight percentage basis when in a form substantially free of other materials.

The properties of a given so-substituted phenol product are affected by the process conditions used to make that product (e.g. molecular weight distribution, color and the like). The resulting reaction product is, as those skilled in the art will appreciate, a complex mixture of various different substituted phenols produced from the reaction of phenol under Friedel-Crafts conditions with the carbocyclic compound starting mixture to produce phenol molecules which are substituted both on ring carbon atoms and on phenol hydroxyl oxygen atoms by moieties derived from such carbocyclic compound.

A substituted carbocyclic compound phenol product can be prepared in a form substantially free of starting materials by conventional distillation separation techniques (e.g. steam distillation, vacuum stripping, and the like), as those skilled in the art will appreciate, but in making resoles for use in this invention, such product can be used directly as made.

In general, to produce a second resin for use in this invention, a substituted phenol product, as just described, is neutralized under aqueous liquid phase conditions as by the addition of base, and then from about 0.8 to 2.0 mols of formaldehyde per one mole of phenol (preferably from about 1.0 to 1.5 mols aldehyde per mol of phenol) is mixed with the substituted phenol product (now itself a starting material). Water may be added with the formaldehyde. Formalin is preferred as a source for formaldehyde.

Also, a basic catalyst material, such as hexamethylenetetramine, ammonium hydroxide, triethylamine, sodium hydroxide, or mixtures thereof (or the like) is introduced into the reaction mixture. This basic catalyst can be used to neutralize the starting substituted phenol. Preferred catalysts are organic. The pH of this reaction mixture is maintained above 7.0 and preferably in the range from about 7.5 to 8.5. This reaction mixture is then heated to temperatures of from about 60 to 100° C. for a time sufficient to substantially react most of the aldehyde and produce a desired resole product. Times of from about 20 to 140 minutes are typical. Aqueous liquid phase preparation conditions are generally but not necessarily used.

It will be appreciated that the aldehyde to phenol ratios herein described have reference to the total amount of phenol present before a reaction, including the phenol which is substituted by the carbocyclic compound mixture, as described above.

To optimize electrical properties in second resoles used in this invention, it is preferred to use as a basic catalyst, when reacting such substituted phenols with formaldehyde to make resole resins, one which is organic in character.

In general, such a second resole product as made is a brown colored, unstable, multiphase aqueous emulsion whose viscosity depends, in any given instance, upon process and reactant variables but which usually ranges from a syrupy liquid to a semi-solid state. Such a second resole product usually separates from such aqueous phase as a brown colored material whose viscosity varies from a syrup to a solid. For use in the present invention, such a second resole resin is preferably prepared as a varnish.

To make a second resole resin varnish of this invention, such an emulsion is dehydrated preferably under heat and reduced pressure to a water content of from about 0.5 to 15 weight percent.

After such dehydration, the resulting resin is then dissolved in a relatively volatile, inert organic solvent medium which is as described above.

While the organic liquid used has properties as indicated above, it will be appreciated that such liquid can comprise mixtures of different organic liquids. Preferred liquids are lower alkanols (such as ethanol and methanol) and lower alkanones (such as acetone or methyl ethyl ketone). The term "lower" refers to less than 7 carbon atoms per molecule as used herein. Aromatic and aliphaitc (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 10 weight percent, and more preferably falls in the range of from about 0.5 to 5 weight percent.

Those skilled in the art will appreciate that care should preferably be taken to use an organic liquid system in which the phenolic resole resins are completely soluble as well as any water present. Adding, for example, a ketone or an ether-ester solvent like butyl cellosolve will generally improve the water tolerance (ability to dissolve water) of a solvent system.

The second resole resin varnishes, thus made, are characteristically dark coolred, one-piece, clear liquid solutions each having a viscosity ranging from about 5–5000 centipoises. The exact viscosity of a given varnish, depends upon many chemical process and product variables. For impregnating applications, viscosities of from about 50 to 500 centipoises are preferred.

The total solids content of a given varnish can be as high as about 85 percent or even higher and as low as about 20 weight percent or even lower, but preferred solids contents usually fall in the range of from about 25 to 65 weight percent.

To use a cellulosic substrate which has been first and secondly impregnated as described above for the manufacture of laminates, it is preferred to employ such a twice impregnated intermediate sheet member which has been advanced to an extent such that it has a cold flow of from about 3 to 20 percent (preferably from about 5 to 15 percent). To so advance a sheet member to such a flow, it is convenient to heat in air such an intermediate sheet to temperatures in the range of from about 30 to 180° C. for a time sufficient to advance same to the so-desired extent. It will be appreciated that such an advancement can be conveniently accomplished while residual volatile materials are being removed in a drying operation after impregnation, as indicated above.

Intermediate sheet like members of this invention, whether advanced to the extent indicated or not, are generally at least about 4 mils thick and can be as thick as 20 mils, though thicknesses not more than about 10 mils are preferred.

The density of an individual intermediate sheet-like member is relatively unimportant since the laminate, as described below, is formed under heat and pressure conditions which generally solidify all components together into an integral, solid, non-porous, thermoset mass.

To make a laminate construction of this invention, one forms: at least one sheet like member (preferably advanced as described above) into a layered configuration which is at least two layers thick with adjoining layers being substantially in face-to-face engagement. As those skilled in the art will appreciate, an individual laminate construction of the invention can comprise a series of different impregnated cellulosic substrate members at least one of which is an intermediate sheet like member of this invention or it can comprise a series of similar such intermediate members depending upon properties desired in the product laminate.

Such a layered configuration is then subjected to pressure in the range of from about 50 to 200 p.s.i. while maintaining temperatures in the range of from about 120 to 180° C. for a time sufficient to substantially completely thermoset the composite and thereby produce a desired laminate. Preferably, the laminate is pressed at 140–160° C. at 500–1500 p.s.i. for 15–60 minutes. It is preferred to use sheet members of this invention as the sole components for laminates of this invention.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on weight basis.

Examples of second impregnating compositions suitable for use in this invention are prepared as follows. In this example, the substituted phenol-formaldehyde resole resin used in each instance has an aldehyde to (theoretical) phenol ratio of from about 0.8 to 2.0, is produced by reacting under aqueous liquid phase conditions formaldehyde and an indicated substituted phenol mixture in the presence of an organic basic catalyst, is substantially insoluble in water but soluble in in acetone to an extent that a 55 weight percent solution thereof, in acetone can be prepared, and has a free formaldehyde content of less than about 5 weight percent. The substituted phenol mixture itself is prepared by reacting on indicated mixture of carbocyclic compounds with phenol at a temperature ranging from about 25 to 200° C. using from about 35 to 80 parts of weight of such carbocyclic compound mitxure (excluding diluents) for each 100 parts by weight of phenol.

Example A 100 parts of phenol and 1 part of concentrated sulphuric acid as an acid catalyst are changed to a suitable reaction vessel and heated to 50° C. 70 parts of a carbocyclic compound mixture available commercially from the Monsanto Company under the trade designation Resin Oil and having a composition as given above in Table I is added to the starting mixture while keeping the temperature stable at 50° C. The temperature of the resulting mixure is held at 50° C. after addition of the carbocyclic compound mixture for 1 hour and then to this resulting mixture is added 7.5 cc. of 28% $NH_4OH$ to neutralize the acid catalyst. To this neutralized reaction mixture is added 2 parts of triethylamine and 60 parts of 50% formalin (50–60 formaldehyde-water). Now this reaction mixture is heated to a reflux at 100° C. and is refluxed thusly for 4 hours. Then the reaction mixture is cooled and volatile materials are removed under a vacuum or 28 inches of mercury until the temperature of the mixture rises to 80° C. Then 50 parts of methanol and 10 parts of acetone are added to the resin product to form a solution having 71.4% solids (measured by heating 1¼ grams of resin product for 3 hours at 135° C.), an Ostwald viscosity of 4582 centipoises at 25° C., a pH of 8.42 and a water content of 1.76%.

Example B 100 parts of phenol and 1 part of concentrated sulphuric acid as an acid catalyst are changed to a suitable reaction vessel and heated to 50° C. 50 parts of the carbocyclic compound mixture used in Example A are added to the starting gradually over a period of 30 minutes. The temperature of the reaction mixture rises due to an exothermic reaction. The temperature of the mixture is held at 75° C. for 30 minutes and then 7.5 parts of 28% $NH_4OH$ is added to neutralize the acid catalyst. To this neutralized reaction mixture is added 2 parts of triethylamine and 60 parts of 50% formalin. Now this reaction mixture is heated to a reflux at 100° C. and is reflected thusly for 2 hours. Then the reaction mixture is cooled and volatile materials are removed under a vacuum of 28 inches of mercury until the temperature of the mixture rises to 80° C. Then 60 parts of methanol are added to the resin product to form a solution having solids content of 68.5%, a pH of 8.62, and a water content of 1.9%.

Examples C through N

The following examples are presented in tabular form for brevity. The process in all instances is as in Example A except that the indicated variables are altered as shown in Table III below in each respective instance.

In Table III carbocyclic compound mixture A is Monsanto Resin Oil; B is Enjay's Heart Cut LPD; and C is Gulf Resin Former Feedstock (see Table I). Also in Table III below, the numbers listed under "Type Catalyst" designate specific Friedel-Crafts catalysts as follows:

1—$H_2SO_4$
2—$BF_3$·diethyl ether

TABLE III

| Ex. No. | Phenol | Type catalyst | Amount catalyst | Type carbocyclic compound mixture | Amount carbocyclic compound mixture | Reaction Temp. °C. | Post reaction time, min. |
|---|---|---|---|---|---|---|---|
| C | 100 | 1 | 1.0 | A | 50 | 50 | 15 |
| D | 100 | 1 | 1.0 | A | 50 | 75 | 15 |
| E | 100 | 1 | 0.3 | A | 70 | 100 | 15 |
| F | 100 | 1 | 0.3 | A | 80 | 75 | 15 |
| G | 100 | 1 | 0.3 | B | 90 | 75 | 45 |
| H | 100 | 2 | 0.5 | B | 70 | 50 | 15 |
| I | 100 | 1 | 0.3 | A | 70 | 75 | 15 |
| J | 100 | 1 | 0.3 | C | 50 | 75 | 15 |
| K | 100 | 2 | 0.5 | C | 90 | 75 | 15 |
| L | 100 | 1 | 0.3 | C | 125 | 85 | 15 |
| M | 100 | 1 | 0.3 | C | 50 | 50 | 45 |
| N | 100 | 1 | 0.3 | C | 75 | 125 | 15 |

Example O

To a suitable vessel is charged phenol (100 parts) and sulfuric acid (0.3 part). The carbocyclic mixture of Example A (70 parts) is metered into the starting mixture of stirred phenol plus acid at 70–80° C. After this addition, triethylamine (2 parts), hexamethylenetetramine (3 parts) and 50% formalin (60 parts) are added. After refluxing for 110 minutes, the mixture is dehydrated to 60° C. and 28" Hg, Methanol (75 parts) and acetone (8 parts) is added and stirred to solution. A 60% solids varnish is thus obtained.

Example P

Charge 100 parts of phenol and 1 part of $BF_3$ to a suitable reaction vessel and heat the mixture to 50° C. Add 70 parts of resin oil to the mixture over a period of 2 hours while keeping the temperature stable at 50° C. After addition of the resin oil, add 5.0 cc. of 28% $NH_4OH$ thereto to neutralize the acid catalyst. To the neutralized reaction mixture add 2 parts of triethylamine and 60 parts of 50% formalin (50–50 formaldehyde-water). Now heat the reaction mixture to a reflux at 90° C. and continue refluxing the mixture for 2 hours. Then cool the reaction mixture and remove volatile material under a vacuum of 27 inches of mercury until a temperature of 80° C. is reached. Then add 50 parts of methanol to the reaction mixture. A 70% solids varnish is thus obtained.

Examples of first impregnating compositions suitable for use in this invention are prepared as follows:

Example Q

A water soluble resole resin of phenol and formaldehyde is prepared as follows:

Phenol (100 parts), 50% formalin (111 parts) and triethylamine (5 parts) are charged to a vessel. After reacting at 70° C. until the mixture's free formaldehyde content is less than 4 percent, the mixture is cooled. The resin product contains about 55 percent solids dissolved in water.

To this product is added 100 parts by weight of a carboxylated alkadiene interpolymer latex as described above comprising styrene, butadiene, and about 4–6 weight percent acrylic acid and having about 48% by weight solids colloidally dispersed in an aqueous medium (known as Dow 636 latex and available from the Dow Chemical Co., Midland, Mich.). The resulting mixture contains about 52 weight percent solids.

To this resulting mixture is added about 320 parts by weight of a 270/50 mixture of isopropanol/water with stirring to produce a product mixture having a total solids content of about 20 weight percent.

Example R

Part A.—Charge 100 parts of phenol and 111 parts of 50% formalin (50–50 formaldehyde-water) to suitable reaction vessel. Add 5 parts of triethylamine to the vessel and react the mixture at 70° C. under reflux conditions to an end point of about 3.25% free formaldehyde. The reaction is then cooled to 25° C. The resin obtained is a low-molecular weight pretreat phenolic resin and recovered as a 56% resin solids aqueous solution.

Part B.—The 100 parts of the resin of Part A mix 100 parts of a commercially available carboxylated styrene-butadiene (60/40) latex containing 48% solids. To this mixture containing 52% solids add 320 parts of a 270/50 mixture of isopropanol/water with stirring to obtain a 20% solids solution of the latex dispersed with the resin.

This latex is a carboxylated alkadiene interpolymer of styrene butadiene and acrylic acid as described above and known commercially as Dow 636 latex (available from the Dow Chemical Company, Midland, Mich.).

Example S

Part A.—A pressure vessel is charged with water (140 parts), styrene (45 parts), butadiene (50 parts), acrylic acid (5 parts), Triton X–770 (2 parts), Triton X–100 (1 part), sodium bisulfite (0.10 part) and potassium persulfate (0.25) the persulfate and bisulfate are added incrementally during the reaction. After heating at 50° C. for 30 hours the latex is vacuum stripped to 50% solids.

Part B.—The latex of Example S, Part A (100 parts) is then mixed with 100 parts of the resin of Example R, Part A. To this mixture containing 52% solids add 320 parts of a 270/50 mixture of isopropanol/water with stirring to obtain a 20% solids solution of the latex-dispersed with the resin.

Example T

Part A.—A pressure vessel was charged with water (140 parts), acrylonitrile (25 parts), butadiene (70 parts), acrylic acid (5 parts), Nekal Bx (3 parts), Sodium pyrophosphate (0.3 part), sodium bisulfite (0.1 part) and potassium persulfate (0.25 part). The persulfate and bisulfite were added incrementally during the reaction. After heating at 50° C. for 22 hours the latex was vacuum stripped to 50% solids.

Part B.—The latex of Example T, Part A is then mixed with 100 parts of the resin of Example R, Part A. To this mixture containing 52% solids add 320 parts of a 270/50 mixture of isopropanol/water with stirring to obtain a 20% solids solution of the latex dispersed in the resin.

Examples of intermediate sheet-like members of this invention are prepared as follows:

Examples 1–18

Samples of preformed cellulosic substrate types are chosen, as follows:

Type 1: Non woven cotton linters paper, about 10 mils in thickness.
Type 2: Non-woven unbleached kraft paper about 7 mils in thickness.
Type 3: Non-woven & cellulose paper about 10 mils in thickness.
Type 4: Non-woven bleached kraft paper about 15 mils in thickness.
Type 5: Woven cotton duck cloth about 8 oz. weight.
Type 6. Woven linen cloth about 4 oz. weight.

All types have an ash content less than about 0.9 weight percent.

The impregnation procedure for twice impregnating each above substrate is as follows:

Preformed cellulosic sheets are passed through the first impregnating solution (Example R, Part B), drawn through the nip region between a pair of squeeze rolls to remove excess resin and hung in an oven at 135° C. for drying to a volatile content of less than 2%. Volatile content is the loss of weight of the dried impregnated sheet after exposure to 160° C. for 10 minutes. A resin content of about 25% is thus obtained in each sample sheet so treated (or otherwise as shown in Table IV below).

Next, the so-first impregnated sheets obtained above are passed through the second impregnating resin solution (Example O), drawn between squeeze rolls and dried in a 135° C. oven to obtain in each sheet a total impregnated solids content of about 60% and a flow of 5%.

For purposes of this invention, flow of a green resin sheet is determined by the following procedure.

From an impregnated sample sheet, 6 2" diameter discs are cut and assembled together in deck fashion in face-to-face engagement. Then, to opposed faces of the resulting deck there is applied about 1000 p.s.i. pressure using 150° C. for 5 minutes. Thereafter, the discs are cooled and any resin which has exuded from the discs is removed by abrasion, scraping, or the like. The difference in weight between the green sandwich and the pressed sandwich is flow.

The volatile content of each such sheet is less than 5%. The results are summarized in Table IV below.

TABLE IV

| Example No. | Preformed sheet type | Pretreat resin: Type | Pretreat resin: Resin content in sheet (dry wt. basis) | Overtreat resin: Type | Overtreat resin: Resin content in sheet (dry wt. basis) | Flow in product sheet, percent |
|---|---|---|---|---|---|---|
| 1 | 1 | Q | 20 | O | 60 | 5 |
| 2 | 1 | Q | 30 | O | 60 | 5 |
| 3 | 2 | R, Part B | 25 | E | 55 | 7 |
| 4 | 3 | S, Part B | 24 | O | 59 | 5 |
| 5 | 4 | T, Part B | 26 | O | 58 | 6 |
| 6 | 5 | R, Part B | 22 | C | 56 | 7 |
| 7 | 6 | Q | 27 | M | 58 | 10 |
| 8 | 5 | Q | 15 | D | 57 | 5 |
| 9 | 5 | S, Part B | 25 | D | 58 | 6 |
| 10 | 5 | T, Part B | 25 | D | 57 | 5 |
| 11 | 1 | R, Part B | 15 | O | 60 | 7 |
| 12 | 1 | R, Part B | 20 | O | 59 | 7 |
| 13 | 1 | S, Part B | 25 | O | 61 | 5 |
| 14 | 1 | T, Part B | 25 | O | 60 | 5 |
| 15 | 2 | Q | 20 | H | 60 | 6 |
| 16 | 2 | Q | 20 | N | 61 | 4 |
| 17 | 2 | Q | 20 | G | 59 | 5 |
| 18 | 2 | Q | 20 | C | 59 | 5 |

Examples of laminates of this invention are prepared as follows:

Examples 19–26

Using the intermediate sheet-like members prepared above in Examples 1–18, laminates are prepared.

The lamination procedure involves the steps of first assemblying a prechosen plurality of intermediate sheet-like members into a deck or sandwich and then applying to the opposed exposed forces of the resulting deck appropriate heat and pressure for a time sufficient to substantially completely cure the impregnated resins and produce the desired laminates. These laminates have excellent cold punchability and electrical characteristics. The details are summarized in Table No. V below:

TABLE 5

| Example No. | Impreg. cellulosic sheet members as described in Example No. | No. of layers used | Laminate forming conditions: Pressure, p.s.i. | Laminate forming conditions: Temperature, ° C. | Laminate forming conditions: Time, min. |
|---|---|---|---|---|---|
| 19 | 1 | 5 | 1,000 | 160 | 30 |
| 20 | 3 | 8 | 1,000 | 150 | 30 |
| 21 | 4 | 6 | 1,300 | 150 | 30 |
| 22 | 12 | 6 | 1,000 | 140 | 45 |
| 23 | 13 | 7 | 1,000 | 150 | 30 |
| 24 | 14 | 8 | 1,000 | 150 | 30 |
| 25 | 16 | 8 | 1,000 | 150 | 30 |
| 26 | 18 | 8 | 1,000 | 150 | 30 |

Example No. 27

Part A.—Two test alminates are prepared from 10 mil electrical grade cotton linters paper. One series of papers are immersed in the solution of low molecular weight phenol-formaldehyde resin of Example R, Part A. Another series of papers are immersed in the latex-resin solution of Example R, Part B. Both series of papers are drawn between squeeze rolls and then dried in an oven at 135° C. for 15 minutes to obtain a 1.3% volatile level. Each paper has a resin content of 24% based on the weight of the paper. Each of the dried papers is immersed in the resin solution of Example O and then drawn between squeeze rolls and dried in an oven at 135° C. for six minutes. Each paper has a total resins content of 58.0%, a volatile level of 7.3% and a resin flow of 14%. Eight plies of each series of dried impregnated paper are separately assembled and cured for 30 minutes at 160° C. under a pressure of 1000 p.s.i. to form a laminate about 1/16 inch thick. Various properties of the test laminates are given in Table I.

TABLE 1

| Laminate | Water absorption, percent | Dielectric constant (1) A | Dielectric constant (1) D24/23 | Dissipation factor (1) A | Dissipation factor (1) D24/23 | Cold punch |
|---|---|---|---|---|---|---|
| Papers pre-treated with Part A, Example R, resin | 0.38 | 4.5 | 4.7 | 0.035 | 0.037 | Cracks. |
| Papers pre-treated with Part B, Example R, resin | 0.45 | 4.2 | 4.3 | 0.034 | 0.036 | No cracks. |

Part B.—Four test laminates are prepared from resin treated 10 mil electrical grade cotton linters paper. The laminates are prepared by pressing eight plies of the treated paper for 30 minutes at 160° C. under a pressure of 100 p.s.i. The characteristics of the treated papers are given in Table 2A and the properties of the test laminates are given in Table 2B.

TABLE 2A

| Laminate | Pre-treat resin (content) [1] | Overtreat resin | Total resin Content, percent | Volatile | Flow |
|---|---|---|---|---|---|
| A | None | Resin of Example II | 62 | 4.7 | 17 |
| B | Resin of Example R, Part A (15%) | do | 63 | 5.0 | 18 |
| C | A carboyxlated styrene-butadiene latex (19%) | do | 57 | 4.7 | 5 |
| D | Resin of Example R, Part 5 (25%) | do | 60 | 6.4 | 15 |

[1] Based on weight of paper.

TABLE 2B

| Laminate | Water absorption percent | Dielectric constant A | Dielectric constant D24/23 | Dissipation factor A | Dissipation factor D24/23 | Cold flow | Cold punch |
|---|---|---|---|---|---|---|---|
| A | 0.92 | 4.41 | 4.52 | 0.030 | 0.042 | 1.10 | Cracks. |
| B | 0.41 | 4.67 | 4.69 | 0.029 | 0.030 | 0.60 | Do. |
| C | 2.30 | 4.15 | 4.80 | 0.303 | 0.081 | 4.17 | No cracks. |
| D | 0.49 | 4.47 | 4.56 | 0.031 | 0.036 | 0.83 | Do. |

In all instances, the prodcct laminates made from the intermediate twice-impregnated sheets are cold punchable and have good electrical properties (dielectric constants and dissipation factors).

What is claimed is:

1. An intermediate sheet-like member adapted for use in the manufacture of cold punchable laminate comprising:

(A) a substrate comprising cellulosic fibers arranged into a generally integral sheet like form, (B) said substrate being first impregnated with a first composition comprising (dry total weight basis) from about 35 to 65 weight percent of a water-soluble phenol-formaldehyde resole resin and the balance up to 100 weight percent of said first composition being a carboxylated alkadiene interpolymer such that said so-first-impregnated substrate contains from about 5 to 40 weight percent of said first composition (dry total weight basis), (C) said substrate being secondly impregnated with a second composition comprising a substituted phenol-formaldehyde resole resin such that said so-second impregnated substrate contains from about 30 to 60 weight percent of said second composition (dry total weight basis), (D) said substituted phenol-formaldehyde resole resin being characterized by:

(1) having a formaldehyde to phenol mol ratio of from about 0.8 to 2.0, (2) being produced by reacting under aqueous liquid phase conditions formaldehyde and a substituted phenol mixture in the presence of catalyst, (3) being substantially insoluble in water but having a viscosity in methanol solution at 60 weight percent solids concentration not greater than about 5000 centipoises, and (4) having a free formaldehyde content which is less than about 5 weight percent, (E) said substituted phenol mixture having been prepared by reacting phenol under Friedel-Crafts conditions with from about 10 to 80 parts by weight for each 100 parts by weight of said phenol of a mixture of carbocyclic compounds, (F) said mixture of carbocyclic compounds comprising (on a 100 weight percent basis when in a form substantially free of other materials);

(1) from about 10 through 40 weight percent (total mixture basis) of compounds each molecule of which has:

(a) the indene nucleus, (b) from 9 through 13 carbon atoms, (c) as nuclear substituents from 0 through 4 methyl groups, (2) from about 5 through 70 weight percent (total mixture basis) of compounds each molecule of which has:

(a) the dicyclopentadiene nucleus, (b) from 10 through 13 carbon atoms, (c) as nuclear substituents from 0 through 3 methyl groups, (3) from about 15 through 65 weight percent (total mixture basis) of compounds each molecule of which has:

(a) a phenyl group substituted by a vinylidene group, (b) from 8 through 3 groups selected from the class consisting of methyl and ethyl, (4) from about 0 through 5 weight percent divinyl benzene, (5) provided that the sum total of all such compounds in any given such mixture of carbocyclic compounds is always 100 weight percent.

2. A sheet-like member of claim 1 wherein has been heated to an elevated temperature for a time sufficient to advance said composition to an extent such that said member has a flow of from about 3 to 20 percent.

3. A laminate construction comprising:

(A) at least one sheet-like member of claim 2 arranged into a layered configuration which is at least two layers thick with adjoining layers being substantially in face-to-face contact, and (B) such layered configuration haing been subjected to elevated pressures and elevated temperatures for a time sufficient to substantially completely thermoset said first composition and said second composition and to bond adjoining layers together in face-to-face engagement thereby to form the desired laminate construction.

4. In a process for making an intermediate sheet-like member adapted for use in the manufacture of cold punchable laminates using as a starting material a substrate of cellulosic fibers arranged into a generally integral sheet-like form which has been first impregnated with a first composition comprising (dry total weight basis) from about 35 to 65 weight percent of a water-soluble phenol-formaldehyde resole resin and the balance up to 100 weight percent of said first composition being a carbocyclic alkadiene interpolymer such that said so-first-impregnated substrate contains from about 5 to 40 weight percent of said first composition, the improvement which comprises the steps of:

(A) secondly impregnating a said so-first-impregnated laminate with a second composition comprising (dry total weight basis) from about 30 to 60 weight percent of a dissolved substituted phenol-formaldehyde resole resin, from about 0 to 15 weight percent of dissolved water, and the balance up to 100 weight percent (total second composition basis) being an organic liquid which:

(1) is substantially inert, (2) evaporates below about 150° C. at atmospheric pressure, and (3) is a mutual solvent for said substituted phenol-formaldehyde resole resin and for said water (if presented), to an extent such that the resulting so-impregnated substrate contains from about 30 to 70 weight percent of said second composition, (B) said substituted phenol-formaldehyde resole resin being characterized by:

(1) having a formaldehyde to phenol mol ratio of from about 0.8 to 2.0, (2) being produced by reacting under aqueous liquid phase conditions formaldehyde and a substituted phenol mixture in the presence of a basic catalyst, (3) being substantially insoluble in water but having a viscosity in methanol solution at 60 weight percent solids concentration not greater than about 5000 centipoises, and (4) having a free formaldehyde content which is less than about 5 weight percent, (C) said substituted phenol mixture having been prepared by reacting phenol under Friedel-Crafts conditions with from about 35 to 80 parts by weight for each 100 parts by weight of said phenol of a mixture of carbocyclic compounds, (D) said mixture of carbocyclic compounds comprising (on a 100 weight percent basis when in a form substantially free of other materials):

(1) from about 10 through 40 weight percent (total mixture basis) of compounds each molecule of which has:

(a) the indene nucleus, (b) from 9 through 13 carbon atoms, (c) as nuclear substituents from 0 through 4 methyl groups, (2) from about 5 through 70 weight percent (total mixture basis) of compounds each molecule of which has:

(a) the dicyclopentadiene nucleus, (b) from 10 through 13 carbon atoms, (c) as nuclear substituents from 0 through 3 methyl groups, (3) from about 15 through 65 weight percent (total mixture basis) of compounds each molecule of which has:

(a) a phenyl group substituted by a vinylidene group, (b) from 8 through 13 carbon atoms, (c) as substituents from 0 through 3 groups selected from the class consisting of methyl and ethyl, (4) from about 0 through 5 weight percent divinyl benzene, (5) provided that the sum total of all such compounds in any given such mixture of carbocyclic compounds is always 100 weight percent.

5. A process for making an intermediate sheet-like member adapted for use in the manufacture of cold punchable laminates comprising the steps of:

(A) first impregnating a substrate comprising cellulosic fibers arranged into a generally integral sheet like form with a first liquid composition comprising a mixture of a first dissolved water soluble phenol-formaldehyde resole resin and an aqueous phase colloidially dispersed carboxylated alkadiene interpolymer, the liquid portion of said first composition being water and an organic liquid which (1) is substantially inert (2) evaporates below about 150° C. at atmospheric pressure, and (3) is a mutual solvent for said first resole resin and said water, thereby to produce an impregnated sheet-like member wherein the impregnated material comprises (dry total weight basis) from about 35 to 65 weight percent of said first resole resin and the balance up to 100 weight percent said carbocyclic alkadiene interpolymer, the resulting so impregnated substrate containing from about 5 to 40 weight percent of said impregnated material.

(B) secondly impregnating a said so-first-impregnated laminate with a second composition comprising (dry total weight basis) from about 30 to 70 weight percent of a second dissolved substituted phenol-formaldehyde resole resin, from about 0 to 15 weight percent of dissolved water, and the balance up to 100 weight percent (total second composition basis) being an organic liquid which:

(1) is substantially inert, (2) evaporates below about 150° C. at atmospheric pressures, and (3) is a mutual solvent for said second resole resin, and for said water (if present), to an extent such that the resulting so-impregnated substrate contains from about 30 to 70 weight percent of said second composition, (C) said second dissolved substituted phenol-formaldehyde resole resin being characterized by:

(1) having a formaldehyde to phenol mol ratio of from about 0.8 to 2.0, (2) being produced by reacting under aqueous liquid phase conditions formaldehyde and a substituted phenol mixture in the presence of a basic catalyst, (3) being substantially insoluble in water but having a viscosity in methanol solution at 60 weight percent solids concentration not greater than about 5000 centipoises, and (4) having a free formaldehyde content which is less than about 5 weight percent, (D) said substituted phenol mixture having been prepared by reacting phenol under Friedel-Crafts conditions from about 35 to 80 parts by weight for each 100 parts by weight of said phenol of a mixture of carbocyclic compounds.

(E) said mixture of carbocyclic compounds comprising (on a 100 weight percent basis when in a form substantially free of other materials):

(1) from about 10 through 40 weight percent (total mixture basis) of compounds each molecule of which has:

(a) the indene nucleus, (b) from 9 through 13 carbon atoms, (c) as nuclear substituents from 0 through 4 methyl groups, (2) from about 5 through 70 weight percent (total mixture basis) of compounds each molecule of which has:

(a) the dicyclopentadiene nucleus, (b) from 10 through 13 carbon atoms, (c) as nuclear substituents from 0 through 3 methyl groups, (3) from about 15 through 65 weight percent (total mixture basis) of compounds each molecule of which has:

(a) a phenyl group substituted by a vinylidene group, (b) from 9 through 13 carbon atoms, (c) as substituents from 0 through 3 groups selected from the class consisting of methyl and ethyl, (4) from about 0 through 5 weight percent divinyl benzene, (5) provided that the sum total of all such compounds in any given such mixture of carbocyclic compounds is always 100 weight percent.

6. In a process for making a laminate construction using a sheet-like member of the type described in claim 1, the improvement which comprises the steps of (A) heating at least one such sheet-like member at temperatures in the range of from about 30 to 180° C. for a time to advance some to an extent such that the resulting sheet-like member has a flow of from about 3 to 20 percent, (B) forming at least one such so-advanced sheet-member into a layered configuration at least two layers thick with adjoining layers being substantially in face-to-face engagement, (C) subjecting the resulting layered configuration to pressures in the range of from about 50 to 2000 p.s.i. while maintaining temperatures in the range of from about 120 tor 180° C. for a time sufficient to substantially completely thermoset said composition and thereby produce a desired ltminate construction.

7. A process for making a laminate construction using a sheet-like member of the type described in claim 2 comprising the steps of (A) forming at least one such sheet-like member into a layered configuration at least two layers thick with adjoining layers being substantially in face-to-face engagement, and (B) subjecting the resulting layered configuration to pressure in the range of from about 50 to 2000 p.s.i. while maintaining temperatures in the range of from about 120 to 180° C. for a time sufficient to substantially completely thermoset said composition and thereby produce a desired liminate construction.

8. The sheet member of claim 1 wherein said carbocyclic compound mixture comprises:

(A) from about 20 through 40 weight percent (total mixture basis) of compounds each molecule of which has:

(1) the indene nucleus, (2) from 9 through 13 carbon atoms, (3) as neuclear substituents from 0 through 3 methyl groups, (B) from about 15 through 30 weight percent (total mixture basis) of compounds each molecule of shich has:

(1) the dicyclopentadiene nucleus, (2) from 10 through 13 carbon atoms, (3) as nuclear substituents from 0 through 3 methyl groups, (C) from about 30 through 65 weight percent (total mixture basis) of compounds each molecule of which has:

(1) a phenyl group substituted by a vinylidene group, (2) from 8 through 13 carbon atoms, (3) as substitutents from 0 through 3 groups selected from the class consisting of methyl and ethyl, (D) from about 0 through 5 weight percent divinyl benzene, (E) provided that the sum total of all such compounds in any given such mixture of carbocyclic compounds is always 100 weight percent.

9. The process of claim 4 wherein said carbocyclic compound mixture comprises:

(A) from about 20 through 40 weight percent (total mixture basis) of compounds each molecule of which has:

(1) the indene nucleus, (2) from 9 through 13 carbon atoms, (3) as nuclear substituents from 0 through 4 methyl groups, (B) from about 15 through 30 weight percent (total mixture basis) of compounds each molecule of which has:

(1) the dicyclopentadiene nucleus, (2) from 10 through 13 carbon atoms, (3) as nuclear substituents from 0 through 3 methyl groups, (C) from about 30 through 65 weight percent (total mixture basis) of compounds each molecule of which has:

(1) a phenyl group substituted by a vinylidene group, (2) from 8 through 13 atoms, (3) as substituents from 0 through 3 groups selected from the class consisting of methyl and ethyl, (D) from about 0 through 5 weight percent divinyl benzene, (E) provided that the sum total of all such compounds in any given such mixture of carbocyclic compounds is always 100 weight percent.

References Cited

UNITED STATES PATENTS

| | | | |
|---|---|---|---|
| 2,711,380 | 6/1955 | Pintell | 260—845 |
| 2,871,213 | 1/1959 | Graulich et al. | 260—846 |
| 2,916,971 | 12/1959 | Rosahl et al. | 260—845 |
| 3,328,207 | 6/1967 | Beaulieu et al. | 260—846 |
| 3,345,206 | 10/1967 | Korpman | 260—845 |
| 3,361,693 | 1/1968 | Geschwind | 260—845 |
| 3,475,362 | 10/1969 | Romanick | 260—845 |
| 3,331,730 | 7/1967 | Bean | 161—192 |

MORRIS SUSSMAN, Primary Examiner

U.S. Cl. X.R.

117—76; 156—335; 161—258, 264

PO-1050
(5/69)

UNITED STATES PATENT OFFICE
CERTIFICATE OF CORRECTION

Patent No. 3,594,268 Dated July 20, 1971

Inventor(s) Ronald H. Dahms and George J. Anderson

It is certified that error appears in the above-identified patent and that said Letters Patent are hereby corrected as shown below:

Column 2, line 44, before the expression "composition", insert --- first ---.
Column 2, line 55, "resolve" should read --- resole ---.
Column 2, line 71, "cole" should read --- cold ---.
Column 3, line 44, "ess" should read --- esses ---.
Column 3, line 69, "employement" should read --- employment ---.
Column 4, line 6, "resolve" should read ---resole---.
Column 4, line 11, "collulose" should read --- cellulose ---.
Column 4, line 16, "collulosic" should read --- cellulosic --- line 19, "wove" should read --- woven ---.
Column 4, line 19, "wel" should read --- well --- and "collulosic" should read --- cellulose ---.
Column 4, line 20, "iclude" should read --- include ---.
Column 4, line 71, "an" should read --- any ---.
Column 7, line 16, "aromatic" should read --- aromatics ---.
Column 7, line 29, after the expression "weight", delete --- ) ---.
Column 7, line 46, after the expression "Crafts", insert --- conditions, as indicated ---.
Column 7, delete lines 47 and 48.
Column 7, line 60, "preferbebly"should read --- preferably ---.
Column 8, line 38, after the expression "Temperature", insert --- (°C) ---.
Column 8, line 67, after the expression "second", insert --- resole ---.
Column 8, line 71, "mole" should read --- mol ---.
Column 9, line 60, "coolred" should read --- colored --- and "piece" should read --- phase ---.
Column 9, line 67, after the expression "85", insert --- weight ---.
Column 15, line 21, delete --- the --- (first occurrence).

(continued next page)

/

PO-1050
(5/69)

UNITED STATES PATENT OFFICE
CERTIFICATE OF CORRECTION

Patent No. 3,594,268 Dated July 20, 1971

Inventor(s) Ronald H. Dahms and George J. Anderson

It is certified that error appears in the above-identified patent and that said Letters Patent are hereby corrected as shown below:

Column 15, Table 2A, Laminate C under the Column headed "Volatile", "4.7" should read --- 5.7 --- and Laminate D under the Column headed "Pre Treat Resin (Content), "Part 5" should read --- Part B ---.

Column 15, Table 2B should read as follows:

| Laminate | % Water Absorption | Dielectric Constant A | Dielectric Constant D24/23 | Dissipation Factor A | Dissipation Factor D24/23 | Cold Flow | Cold Punch |
|---|---|---|---|---|---|---|---|
| A | 0.92 | 4.41 | 4.52 | 0.030 | 0.042 | 1.10 | cracks |
| B | 0.41 | 4.67 | 4.69 | 0.029 | 0.030 | 0.60 | cracks |
| C | 2.30 | 4.15 | 4.80 | 0.033 | 0.081 | 4.17 | no cracks |
| D | 0.49 | 4.47 | 4.56 | 0.031 | 0.036 | 0.83 | no cracks |

Column 15, line 45, "producct" should read --- product ---.
Column 15, line 51, "laminate" should read --- laminates ---.
Column 17, line 13, "haing" should read --- having ---.
Column 19, line 5, after the expression "conditions", insert --- with ---.
Column 20, line 3, "3" should read --- 4 ---.
Column 20, line 6, "shich" should read --- which ---.

Signed and sealed this 15th day of February 1972.

(SEAL)
Attest:

EDWARD M.FLETCHER,JR.
Attesting Officer

ROBERT GOTTSCHALK
Commissioner of Patents